US012764064B2

(12) United States Patent
Bradetich et al.

(10) Patent No.: US 12,764,064 B2
(45) Date of Patent: Oct. 13, 2026

(54) COMMUNICATION DEVICE OPERABLE UNDER MULTIPLE CONTROL PLANES

(71) Applicant: Schweitzer Engineering Laboratories, Inc., Pullman, WA (US)

(72) Inventors: Ryan Bradetich, Pullman, WA (US); Rhett Smith, Odessa, FL (US); Daniel B. Rippon, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 329 days.

(21) Appl. No.: 18/329,005

(22) Filed: Jun. 5, 2023

(65) Prior Publication Data

US 2024/0146641 A1 May 2, 2024

Related U.S. Application Data

(60) Provisional application No. 63/381,016, filed on Oct. 26, 2022, provisional application No. 63/381,009, filed on Oct. 26, 2022.

(51) Int. Cl.
*H04L 45/64* (2022.01)
*H04L 45/52* (2022.01)
(Continued)

(52) U.S. Cl.
CPC .............. *H04L 45/64* (2013.01); *H04L 45/52* (2013.01); *H04L 47/2441* (2013.01); *H04L 49/60* (2013.01)

(58) Field of Classification Search
CPC ..... H04L 45/52; H04L 45/64; H04L 47/2441; H04L 49/60
See application file for complete search history.

(56) References Cited

U.S. PATENT DOCUMENTS 6,747,957 B1 6/2004 Pithawala
7,218,632 B1 5/2007 Bechtolsheim
(Continued)

FOREIGN PATENT DOCUMENTS

EP 2765751 8/2014
EP 2787698 B1 * 1/2020 ............. H04L 45/64
(Continued)

OTHER PUBLICATIONS

Abdelrahman Abuarqoub. "A Review of the Control Plane Scalability Approaches in Software Defined Networking", Future Internet 2020, 12, 49, doi:10.3390/fi12030049, Mar. 2020, 15 pages. (Year: 2020).*

(Continued)

*Primary Examiner* — G. C. Neurauter, Jr.
(74) *Attorney, Agent, or Firm* — Fletcher Yoder, P.C.; Richard M. Edge

(57) ABSTRACT

Disclosed are systems and methods for operating a configurable communication device. Operating the configurable communication device includes operating the configurable communication device using a first network architecture control plane type. Then, an indication is received to switch at least part of the configurable communication device to using a second network architecture control plane type. In response to the indication, the configurable communication device operates the at least part of the configurable communication device in a hybrid mode utilizing both the first and second network architecture control plane types.

19 Claims, 7 Drawing Sheets

(51) Int. Cl.
*H04L 47/2441* (2022.01)
*H04L 49/60* (2022.01)

(56) References Cited

U.S. PATENT DOCUMENTS

| | | | | |
|---|---|---|---|---|
| 7,301,949 | B2 * | 11/2007 | Eriksson | H04L 12/4616 370/352 |
| 7,376,831 | B2 | 5/2008 | Kollmyer | |
| 7,751,329 | B2 * | 7/2010 | Lapuh | H04L 49/70 709/239 |
| 7,872,983 | B2 | 1/2011 | Lai | |
| 8,553,544 | B2 | 10/2013 | Lai | |
| 8,593,987 | B2 * | 11/2013 | Kuo | H04L 45/32 370/242 |
| 8,800,044 | B2 | 8/2014 | Raad | |
| 9,038,151 | B1 | 5/2015 | Chua | |
| 9,112,728 | B2 * | 8/2015 | Klein | H04L 12/5692 |
| 9,237,129 | B2 | 1/2016 | Ling | |
| 9,286,171 | B2 | 3/2016 | Cardona | |
| 9,313,129 | B2 * | 4/2016 | Ganichev | H04L 45/745 |
| 9,391,888 | B2 * | 7/2016 | Kuo | H04L 12/66 |
| 9,432,255 | B1 | 8/2016 | Hasan | |
| 9,432,380 | B2 | 8/2016 | Margalit | |
| 9,571,338 | B2 * | 2/2017 | Kamble | H04L 41/08 |
| 9,680,588 | B2 | 6/2017 | Connolly | |
| 9,686,125 | B2 | 6/2017 | Smith | |
| 9,769,060 | B2 | 9/2017 | Dearien | |
| 9,838,305 | B2 * | 12/2017 | Tardo | H04L 45/38 |
| 9,876,685 | B2 * | 1/2018 | Srinivasan | H04L 41/12 |
| 9,923,779 | B2 | 3/2018 | Berner | |
| 10,171,336 | B2 * | 1/2019 | Kern | H04L 41/0813 |
| 10,218,605 | B2 * | 2/2019 | Clarke | H04L 67/59 |
| 10,659,314 | B2 | 5/2020 | Dearien | |
| 2002/0172157 | A1 | 11/2002 | Rhodes | |
| 2003/0112821 | A1 | 6/2003 | Cleveland | |
| 2003/0125924 | A1 | 7/2003 | Lines | |
| 2003/0133443 | A1 | 7/2003 | Klinker | |
| 2003/0188159 | A1 | 10/2003 | Josset | |
| 2005/0025141 | A1 | 2/2005 | Chao | |
| 2005/0078672 | A1 | 4/2005 | Caliskan | |
| 2005/0192008 | A1 | 9/2005 | Desai | |
| 2007/0177600 | A1 | 8/2007 | Suzuki | |
| 2008/0005558 | A1 | 1/2008 | Hadley | |
| 2008/0080384 | A1 | 4/2008 | Atkins | |
| 2009/0257743 | A1 | 10/2009 | Chung | |
| 2009/0285093 | A1 | 11/2009 | Bolt | |
| 2009/0313189 | A1 | 12/2009 | Sun | |
| 2010/0241608 | A1 | 9/2010 | Huang | |
| 2011/0085567 | A1 | 4/2011 | Beecroft | |
| 2011/0087952 | A1 | 4/2011 | Marin | |
| 2012/0113871 | A1 * | 5/2012 | Bulusu | H04L 45/18 370/256 |
| 2013/0077477 | A1 | 3/2013 | Daraiseh | |
| 2013/0108259 | A1 | 5/2013 | Srinivas | |
| 2013/0159865 | A1 | 6/2013 | Smith | |
| 2013/0212285 | A1 | 8/2013 | Hoffmann | |
| 2013/0250770 | A1 | 9/2013 | Zou | |
| 2013/0263247 | A1 | 10/2013 | Jungck | |
| 2013/0294228 | A1 | 11/2013 | Ahuja | |
| 2014/0025945 | A1 | 1/2014 | McGrew | |
| 2014/0029451 | A1 | 1/2014 | Nguyen | |
| 2014/0064100 | A1 | 3/2014 | Edwards | |
| 2014/0112130 | A1 | 4/2014 | Yang | |
| 2014/0115706 | A1 | 4/2014 | Silva | |
| 2014/0129700 | A1 | 5/2014 | Mehta | |
| 2014/0153572 | A1 | 6/2014 | Hampel | |
| 2014/0160939 | A1 | 6/2014 | Arad | |
| 2014/0226467 | A1 | 8/2014 | Park | |
| 2014/0241345 | A1 | 8/2014 | DeCusatis | |
| 2014/0245387 | A1 | 8/2014 | Colpo | |
| 2014/0280834 | A1 | 9/2014 | Medved | |
| 2014/0325038 | A1 | 10/2014 | Kis | |
| 2014/0325649 | A1 | 10/2014 | Zhang | |
| 2014/0371941 | A1 | 12/2014 | Keller | |
| 2014/0376406 | A1 | 12/2014 | Kim | |
| 2015/0081762 | A1 | 3/2015 | Mason | |
| 2015/0112933 | A1 | 4/2015 | Satapathy | |
| 2015/0180769 | A1 * | 6/2015 | Wang | H04L 45/38 370/236 |
| 2015/0195190 | A1 | 7/2015 | Shah Heydari | |
| 2015/0312658 | A1 | 10/2015 | Winzer | |
| 2015/0363522 | A1 | 12/2015 | Maurya | |
| 2016/0043996 | A1 | 2/2016 | Syed Mohamed | |
| 2016/0119299 | A1 | 4/2016 | Amulothu | |
| 2016/0142427 | A1 | 5/2016 | de los Reys | |
| 2016/0165454 | A1 | 6/2016 | Li | |
| 2016/0330076 | A1 | 11/2016 | Tiwari | |
| 2016/0337247 | A1 | 11/2016 | Yao | |
| 2016/0344592 | A1 | 11/2016 | Cook | |
| 2016/0373344 | A1 | 12/2016 | Wohlert | |
| 2017/0026225 | A1 | 1/2017 | Smith | |
| 2017/0026226 | A1 | 1/2017 | Grussling | |
| 2017/0026243 | A1 | 1/2017 | Berner | |
| 2017/0026252 | A1 | 1/2017 | Dearien | |
| 2017/0026276 | A1 | 1/2017 | Dearien | |
| 2017/0026291 | A1 | 1/2017 | Smith | |
| 2017/0026292 | A1 | 1/2017 | Smith | |
| 2017/0026349 | A1 | 1/2017 | Smith | |
| 2022/0038365 | A1 * | 2/2022 | Roberts | H04L 45/64 |
| 2024/0146647 | A1 * | 5/2024 | Bradetich | H04L 45/52 |
| 2024/0275723 | A1 * | 8/2024 | Shakir | H04L 45/44 |

FOREIGN PATENT DOCUMENTS

| | | |
|---|---|---|
| EP | 3605959 | 2/2020 |
| KR | 20150051107 | 5/2015 |
| WO | 2015038040 | 3/2015 |
| WO | 2016094825 | 6/2016 |
| WO | 2022006760 | 1/2022 |

OTHER PUBLICATIONS

Sajad Khorsandroo et al. "Hybrid SDN evolution: A comprehensive survey of the state-of-the-art", Mar. 2021, 40 pages. (Year: 2021).*
Wolfgang Braun, Michael Menth, Software-Defined Networking Using OpenFlow: Protocols, Applications and Architectural Design Choices, Future Internet, May 12, 2014.
Adam Cahn, Juan Hoyos, Matthew Hulse, Eric Keller, Software-Defined Energy Communication Networks: From Substation Automation to Future Smart Grids, Smart Grid Communications, IEEE Oct. 2013.
William J. Dally, Virtual-Channel Flow Control, IEEE Transactions on Parallel and Distributed Systems, vol. 3, No. 2, Mar. 1992.
Sushant Jain, et al., B4: Experience with a Globally-Deployed Software Defined WAN, ACM SIGCOMM Computer Communication Review, vol. 43 Issue 4, pp. 3-14. Oct. 2013.
Matthew Monaco, Oliver Michel, Eric Keller, Applying Operating System Principles to SDN Controller Design, Hotnets '13, Nov. 2013.
Dmitry Drutskoy, Eric Keller, Jennifer Rexford, Scalable Network Virtualization in Software-Defined Networks, IEEE Internet Computing, vol. 17, Issue: 2, Nov. 27, 2012.
Maciej Kuzniar, et al., Automatic Failure Recovery for Software-Defined Networks, HotSDN '13, Aug. 16, 2013.
Tal Mizrahi, Yoram Moses, ReversePTP: A Software Defined Networking Approach to Clock Synchronization, HotSDN '14, Aug. 22, 2014.
Ramon Marques Ramos, et al. SlickFlow: Resilient Source Routing in Data Centere Networks Unlocked by OpenFlow, 2013 IEEE 38th Conference on Local Computer Networks, Oct. 2013.
Ville Torhonen, Designing a Software-Defined Datacenter, Master of Science Thesis, Tampere University of Technology, May 2014.
James S. Thorp, The Protection System in Bulk Power Networks, Power Systems Engineering Research Center, 2003.
Adam Cahn, Software-Defined Energy Communication Networks: From Substation Automation to Future Smart Grids, IEEE Conference, Oct. 21, 2013, p. 560-561.

(56) References Cited

OTHER PUBLICATIONS

European Patent Office Extended European Search Report for Application No. 23200692.4 Mar. 12, 2024.

* cited by examiner

COMMUNICATION DEVICE OPERABLE UNDER MULTIPLE CONTROL PLANES

CROSS-REFERENCE TO RELATED APPLICATIONS

This application claims priority to U.S. Provisional Application No. 63/381,009, filed Oct. 26, 2022, entitled "COMMUNICATION DEVICE OPERABLE UNDER MULTIPLE CONTROL PLANES," the disclosure of which is incorporated by reference herein in its entirety for all purposes. This application also claims priority to U.S. Provisional Application No. 63/381,016, filed Oct. 26, 2022, entitled "CONFIGURABLE COMMUNICATION SYSTEM CONTROL PLANE USING CONFIGURABLE COMMUNICATION DEVICES," the disclosure of which is incorporated by reference herein in its entirety for all purposes.

TECHNICAL FIELD

The present disclosure relates to systems and methods for configurable communication system control plane using configurable communication devices. More particularly, but not exclusively, the techniques disclosed in the present application allow a communication system control plane to be configured between different control planes such as the spanning tree algorithm (STA) and software defined networking (SDN) by command to configurable communication devices.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

DETAILED DESCRIPTION

Figure 1:
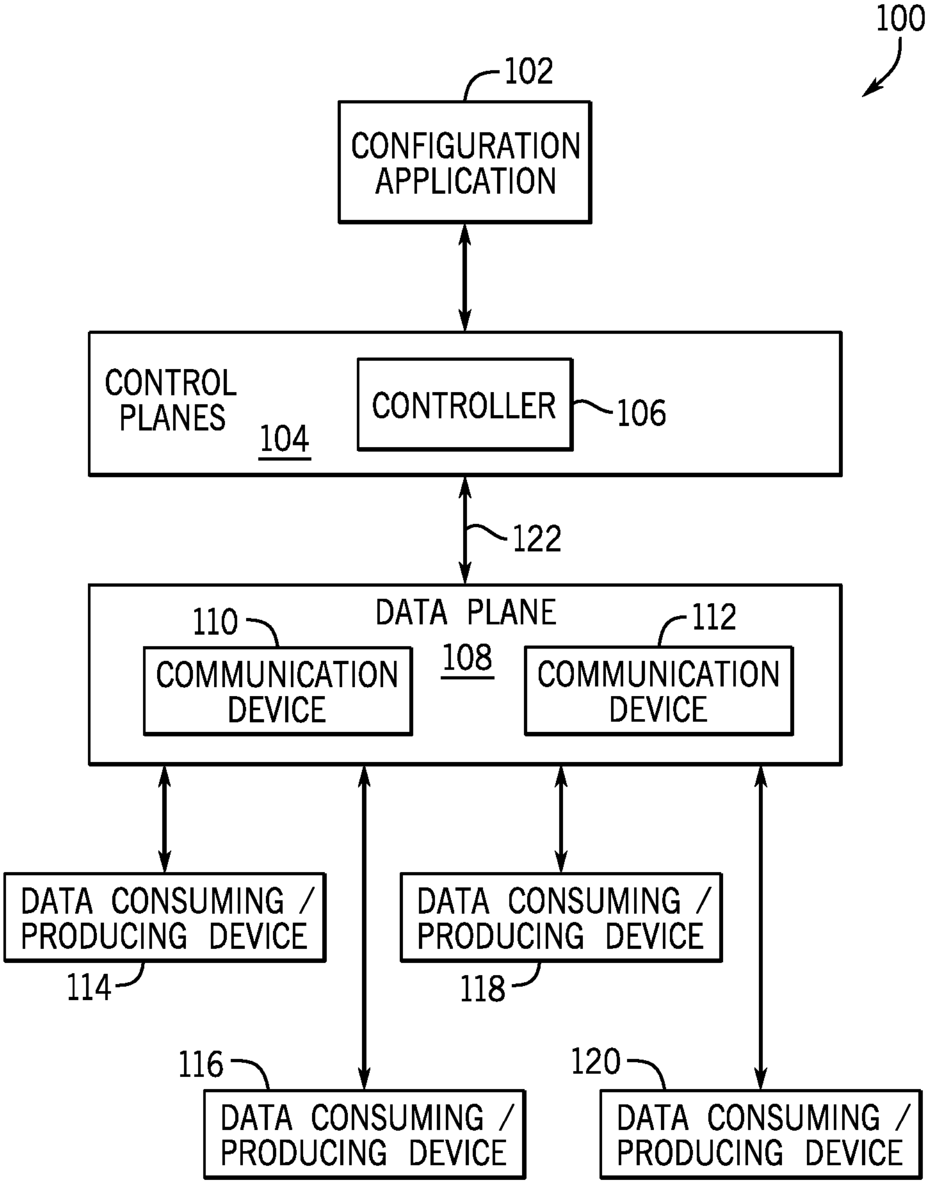
FIG. 1 illustrates an example of a simplified representation of a communication network architecture including a configuration application, multiple control planes, a data plane, and a plurality of data consuming/producing devices.

Systems of devices for the protection, control, and automation of industrial and utility equipment may use a communication network to facilitate various operations. The communication network may be configured to provide secure and reliable exchange of data among the various devices. Redundancies may be built into the devices as well as the communication network. Modern electric power distribution and transmission systems may incorporate a variety of communication technologies that may be used in the protection, control, and automation of the power system. The communication networks carry information necessary for the proper assessment of power system conditions and for implementing control actions based on such conditions. In addition, such messages may be subject to time constraints because of the potential for rapid changes in conditions in the electric power system.

In some instances, some of the devices on the network may include multiple communication ports each that may be useful for communication redundancy. For example, a protective relay that is used to protect, control, and/or automate equipment of an electric power delivery system may be a single device, yet it may include two communication ports each connected on physically distinct media to the communication network in order to provide communication redundancy. One of the communication ports may be in active mode whereby communications received thereby are actively received and sent for further processing by the device. The other of the communication ports may be in inactive mode whereby communications are not sent for further processing. Communication packets intended for the device may be delivered on both communication ports by the communication system. Upon failure of the active communication port or failure of the communication system to complete delivery of communications on the active communication port, the device may activate the inactive communication port and process communications received thereon. In another example, a tie-point between a programmable communications network, such as a software-defined network (SDN) and a traditional communication network (e.g., spanning tree algorithm-based network) may function as a single node with two or more physically distinct media connections. The tie point may be a single device or may include multiple devices configured to act as a single tie point to the programmable communications network. Such nodes or devices that embody a physical networking configuration that uses two or more links to connect into a programmable communications network for redundancy is termed herein as a multipoint node.

Multipoint nodes may present certain challenges in network configuration. One challenge is to prevent delivering the same communication packet to the same interface of the multipoint node. Because a multipoint node includes redundant physical connections to the programmable network, the same communication package may be delivered to the multipoint node on more than one of the physical connections to the programmable network. That is, the programmable network may be configured to deliver every packet destined to the multipoint node (or a device connected to the traditional communication network behind the tie point) to each connection of the multipoint node to the programmable network, but not redundantly delivered on the same connection. Typically, a programmable network may be configured with one or more failover paths if a particular communication path becomes unavailable. Unless the programmable communication network is particularly designed to avoid redundant delivery of communication packets to a single interface of a multipoint node, the failover may result in this unwanted redundant delivery. Furthermore, these multipoint nodes may enable at least one port to be used for a first control plane type and at least one other port to be used for a second control plane type.

What is needed is a tool for path planning in a programmable communication network with multipoint nodes and/or multiple/dynamic control planes. Presented herein are systems and methods to manage path planning in a programmable communication network with multiple/dynamic control planes. Path planning performed by devices and methods described herein deliver communication packets to each multipoint node interface while avoiding redundant delivery on the same interface even under failover conditions.

The embodiments of the disclosure can be further understood by reference to the drawings, wherein like parts are designated by like numerals throughout. Components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. Also, the steps of a method do not necessarily need to be executed in any specific order, or even sequentially, nor need the steps be executed only once unless otherwise specified.

Embodiments herein may be described with reference to an SDN, spanning tree algorithm (STA), or other such protocols. Unless stated otherwise, the systems and methods described herein may be used with an SDN or other applicable programmable communications network. Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

In various embodiments, a controller may be used to configure networking devices, establish network flows, and monitor network conditions. SDN networking technologies offer a variety of advantages to electric power systems. For example, SDN networking technologies allow for rapidly configurable deny-by-default security, better latency control, symmetric transport capabilities, redundancy and failover planning, etc. An SDN supports a programmatic change control platform that allows an entire communication network to be managed as a single asset, simplifies the understanding of the network, and enables continuous monitoring of a network. In an SDN, the systems that decide where the traffic is routed (i.e., the control plane) can be distinct from the systems that perform the forwarding of the traffic in the network (i.e., the data plane).

The control plane may be modified to achieve an optimal or target usage of network resources by creating specific data flows through the communication network. A "flow entry" is used to refer to the set or sets of parameters the control data flows. A "data flow," or simply "flow," is used to refer to any type of data transfer in a network, such as a set or sequence of packets sent from a particular source to a particular unicast, anycast, or multicast destination. Data flow entries may permit specific network paths based on a variety of criteria that offer significant and precise control to operators of the network. In many SDN embodiments, an SDN controller embodies the network control plane and determines how packets (or frames) should flow (or be forwarded) in the network. The SDN controller communicates this information to the networking devices in the data plane by setting their forwarding tables and/or other configuration settings. Accordingly, an SDN enables centralized configuration and management of a network. The data plane in an SDN includes packet forwarding devices with communication interfaces to receive forwarding information from the controller.

One approach to differentiate packets and to forward packets includes VLAN tagging of the packets. A Virtual Local Area Network (VLAN) can segregate traffic in a network with shared topology. Packets may have a VLAN ID or tag to indicate to where the packet should be forwarded. In addition to simplifying management of a network, an SDN architecture also enables monitoring and troubleshooting features that can be beneficial for use in an industrial or utility system.

A variety of communication devices may utilize the various embodiments described herein. A communication device, as the term is used herein, includes any device that is capable of accepting and forwarding data traffic in a data communication network. In addition to the functionality of accepting and forwarding data traffic, communication devices may also perform a wide variety of other functions and may range from simple to complex devices.

Specific examples of communication devices applicable to the systems and methods described herein include, but are not limited to computing devices (e.g., desktop computers, tablets, or other mobile devices such as cellular phones), switches, hubs, repeaters, gateways, routers, network bridges, modems, wireless access points, and line drivers. As used herein the term "communication device" may, as the context allows, also encompass a wide variety of hybrid networking devices such as multilayer switches, protocol converters, terminal adapters, bridge routers, proxy servers, firewall devices, network address translators, multiplexers, network interface controllers, and the like. Thus, while many of the principles of the systems and methods are described herein using a network switch as an example, it is appreciated that such principles may be adapted for use with many other networking device types.

FIG. 1 illustrates an example of a simplified representation of a communication system architecture 100 that may be used in different operational planes of a communication network. The communications system architecture 100 may include/utilize a configuration application 102, one or more control planes 104, a data plane 108, and one or more data consuming/producing devices 114, 116, 118, and 120 (collectively referred to as data consuming/producing devices 114-120). The configuration application 102 may represent any of a variety of applications for configuring the controller 106 within (or embodying) the one or more control planes 104. The configuration application 102 may be implemented by a processor in the same device as each other, by a processor in a same device that includes the controller 106, and/or may be implemented using a different electronic device, such as computing device that is communicatively coupled to the device including the controller 106. For instance, a processor used to at least partially implement the controller 106 may be used to execute instructions from memory to implement the configuration application 102. Additionally or alternatively, a processor external to the controller 106 may be used to execute instructions to implement the configuration application 102. Regardless of implementation location, such an application can be tailored to fit a wide variety of system needs, including path planning as described herein. In some embodiments, monitoring and configuration functions may be combined into a single application that is capable of performing configuration and monitoring.

A pathway 122 may be used to pass information between the data plane 108 and the one or more control planes 104. In some embodiments, the pathway 122 may be configured to implement an SDN as the one or more control planes 104. The SDN protocol operates on and controls how packets are forwarded by configuring the way switching occurs in the communication system architecture 100. The pathway 122 may thereby direct the traffic to the intended networking devices, such as communication devices 110 and 112 on data plane 108.

As illustrated, the data plane 108 includes communication devices 110 and 112 in communication with one another. In various embodiments, the communication devices 110 and 112 may be embodied as switches, multiplexers, and/or other types of communication devices. The communication links may be embodied as Ethernet, fiber optic, and/or other forms of data communication channels. The data consuming/producing devices 114-120 may represent a variety of devices within an electric power transmission and distribution system that produce or consume data to or from the communication devices 110 and 112.

For example, one or more of the data consuming/producing devices 114-120 may be embodied as a pair of transmission line relays configured to monitor an electrical transmission line. The transmission line relays may monitor various aspects of the electric power flowing through the transmission line (e.g., voltage measurements, current measurements, phase measurements, synchrophasors, etc.) and may communicate the measurements to implement a protection strategy for the transmission line. Traffic between the transmission line relays may be routed through the data plane 108 using a plurality of data flows implemented by a controller (e.g., controller 106).

As previously mentioned, the communication devices 110 and 112 (e.g., Ethernet switches) and/or the data consuming/producing devices 114-120 may use any of the one or more control plane types (e.g., STA or SDN). These devices of either control plane type are managed by a controller (e.g., controller 106). The controller 106 manages the inventory, topology, configuration, and situational awareness. That is the controller 106 tracks what devices are on the network and the attributes about the devices like firmware version, serial number, addresses, and operational states. The controller 106 also manages the topology of the network by tracking how all switches are connected together and how hosts on the network are physically connected to the switches. The controller 106 then manages the configuration to the switches making sure the settings remain as they should be. When new changes are made to the network, the settings are calculated and pushed, then baselines updated. In some embodiments, the controller 106 represents the situational awareness of the network by displaying the overlays of both physical and logical states of the network showing how everything is connected on the network along with all the communication threads and their participants in the network.

In various embodiments, the communication devices 110 and 112 of the data plane 108 may be configured to operate in accordance with the control plane(s). The communication devices 110 and 112 may all be configured to operate in accordance with a single control plane such as SDN, with all switches operating SDN firmware. In other embodiments, the communication devices 110 and 112 may be all configured to operate in accordance with a control plane implementing a communication protocol such as spanning tree protocol with all switches operating STA firmware. If a new switch or a replacement switch is needed, it uses the control plane used in the network architecture.

As previously discussed, the communication devices 110 and 112, in accordance with several embodiments herein, may be configurable between SDN and STA. Thus, the switches of the present disclosure may include the ability to convert from STA to SDN and SDN to STA through firmware upgrades or other mechanisms. In some cases, the communication devices 110 and 112 may have multiple control plane capabilities in a single firmware so the conversion between control planes would be configurable with or without firmware upgrades.

The communication devices 110 and 112 may include a database of common attributes that are used for SDN and STA. Accordingly, the communication devices 110 and 112 may support transference and translation of settings and configurations during the conversion process between SDN and STA so that when moving from one control plane to the other, the traffic on the network would see minimal interruption.

Figure 2:
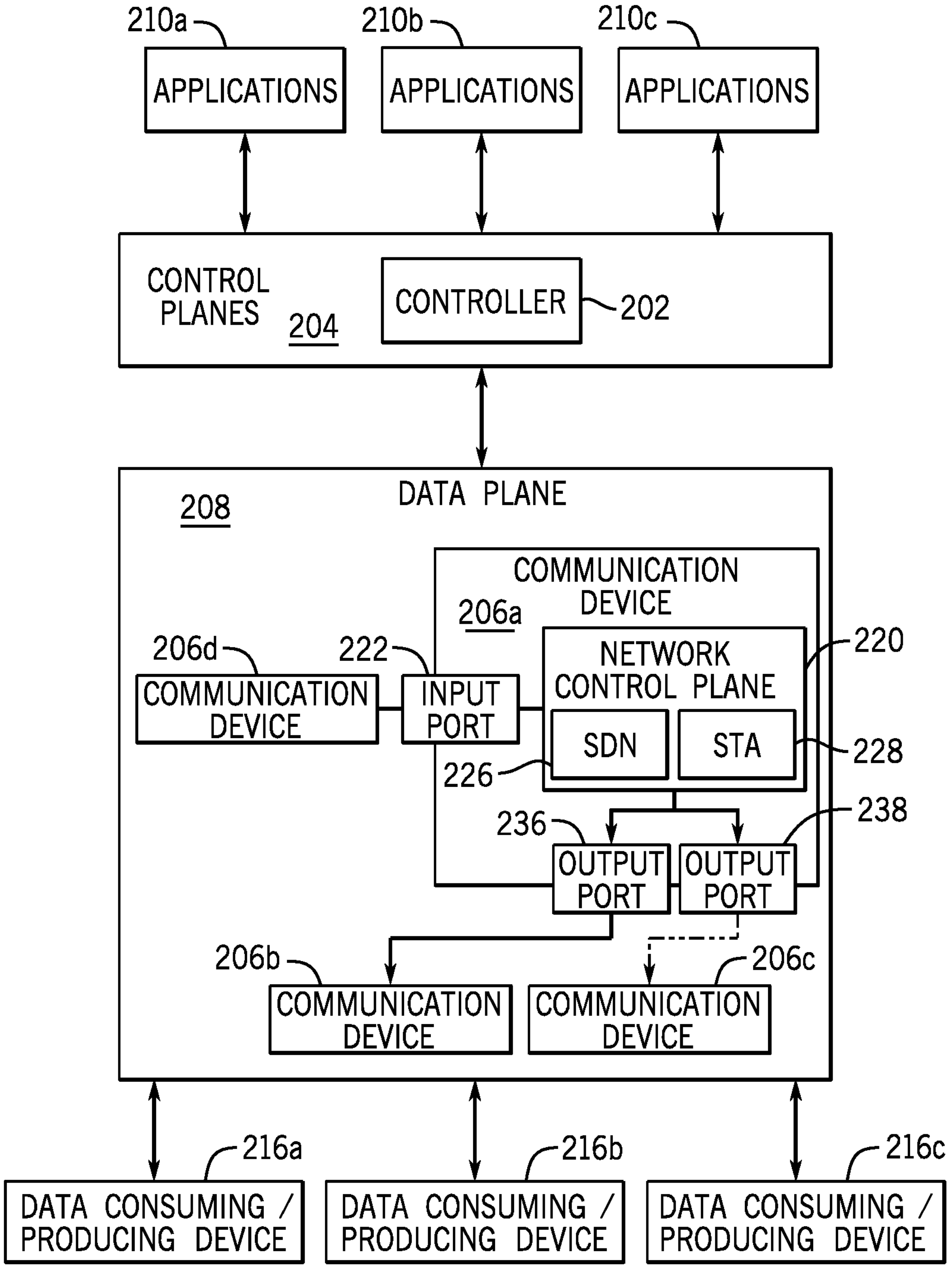
FIG. 2 illustrates a simplified representation of a communication system architecture including a functional block diagram of a communication device of the data plane.

FIG. 2 illustrates a simplified representation of a communications network 200 using communication devices that are configurable to operate in accordance with the one or more control planes implemented on the network. The communications network including one or more control planes 204 (including controller 202), a data plane 208, and a plurality of data-consuming/producing devices 216*a*, 216*b*, and 216*c* (collectively referred to as data-consuming/producing devices 216). The one or more control planes 204 directs the flow of data through the data plane 208. More specifically, a controller 202 may communicate with a plurality of communication devices 206*a*, 206*b*, 206*c*, and 206*d* (collectively referred to as communication devices 206) via an interface to establish data flows. The controller 202 may specify rules for routing traffic through the data plane 208 based on a variety of criteria. In some embodiments, applications 210*a*, 210*b*, and 210*c* (collectively referred to as applications 210) may be used to configure the one or more control planes 204, display control plane(s) configuration(s), display network topology, display communication device data, display communication data, and the like. One such application may be a path planning application used to plan communication paths and/or configure communication devices 206 in accordance with a predetermined protocol.

As illustrated, the data plane 208 includes the plurality of communication devices 206 in communication with one another via a plurality of physical links. In various embodiments, the communication devices 206 may be embodied as switches, multiplexers, and/or other types of communication devices. The physical links may be embodied as Ethernet, fiber optic, and/or other forms of data communication channels.

The communication devices 206 may include various communication ports. Although the ports may be labeled as input port 222 and output ports 236 and 238 for convenience, at least some communication ports may be configured to receive and transmit communication. As illustrated, power delivery devices may include two or more ports (e.g., Ethernet ports) to ensure delivery of critical communications. As illustrated, the communication device 206*a* includes a network control plane 220 that may include computer instructions operable to cause the communication device 206 to execute communications in accordance with the one or more control planes 204. For example, if the one or more control planes 204 implements a SDN, then the network control plane 220 executes SDN instructions 226 such that the communication switch operates as a SDN switch. Similarly, if the one or more control planes 204 implements a STA network, then the network control plane 220 executes STA instructions 228 such that the communication switch operates as an STA switch. Furthermore, as previously noted, a single communication device (e.g., communication device 206*a*) may include multiple ports that utilize different control planes of the one or more control planes 204. For instance, output port 236 may utilize SDN while the output port 238 may utilize STA.

In accordance with several embodiments herein, the communication device 206*a* may be configured with firmware that may enable switching between different control planes. For example, the communication device 206*a* may include firmware for use in a SDN using the SDN instructions 226, but modifiable for use in a STA communication network using the STA instructions 228. Additionally or alternatively, the firmware may be modifiable via firmware upgrade. The firmware upgrade may be performed by the controller 202, another networked device, or directly using a device capable of delivering a firmware upgrade. As such, in some embodiments, the SDN instructions 226 and/or the STA instructions 228 may include corresponding firmware executable to operate the communication device 206*a* in an SDN mode or an STA mode. The communication device 206*a* may select between the SDN firmware and the STA firmware or may have a hybrid firmware that works for both control plane types. When making a selection, the communication device 206*a* may select the firmware based on a command from the controller 202. The communication device 206*a* may select the firmware at configuration time so that it may operate correctly in the communications network at run time. In some situations, the communication device 206*a* may select the firmware depending on a received user configuration. The user configuration may be received via communications, an application, a physical switch on the communication device 206*a*, or the like. As previously mentioned, the use of a particular control plane for the communication device 206 may be device or by port. Additionally or alternatively, in some embodiments, the communication devices 206 may self-discover the appropriate control plane by ingress or lack of ingress by a packet of a data type that is only applicable to one of the available control plane types. In fact, in some embodiments, a single port may run in a hybrid mode where ingressing packets are transmitted to either an STA fabric coupled to the communication device.

Figure 3A:
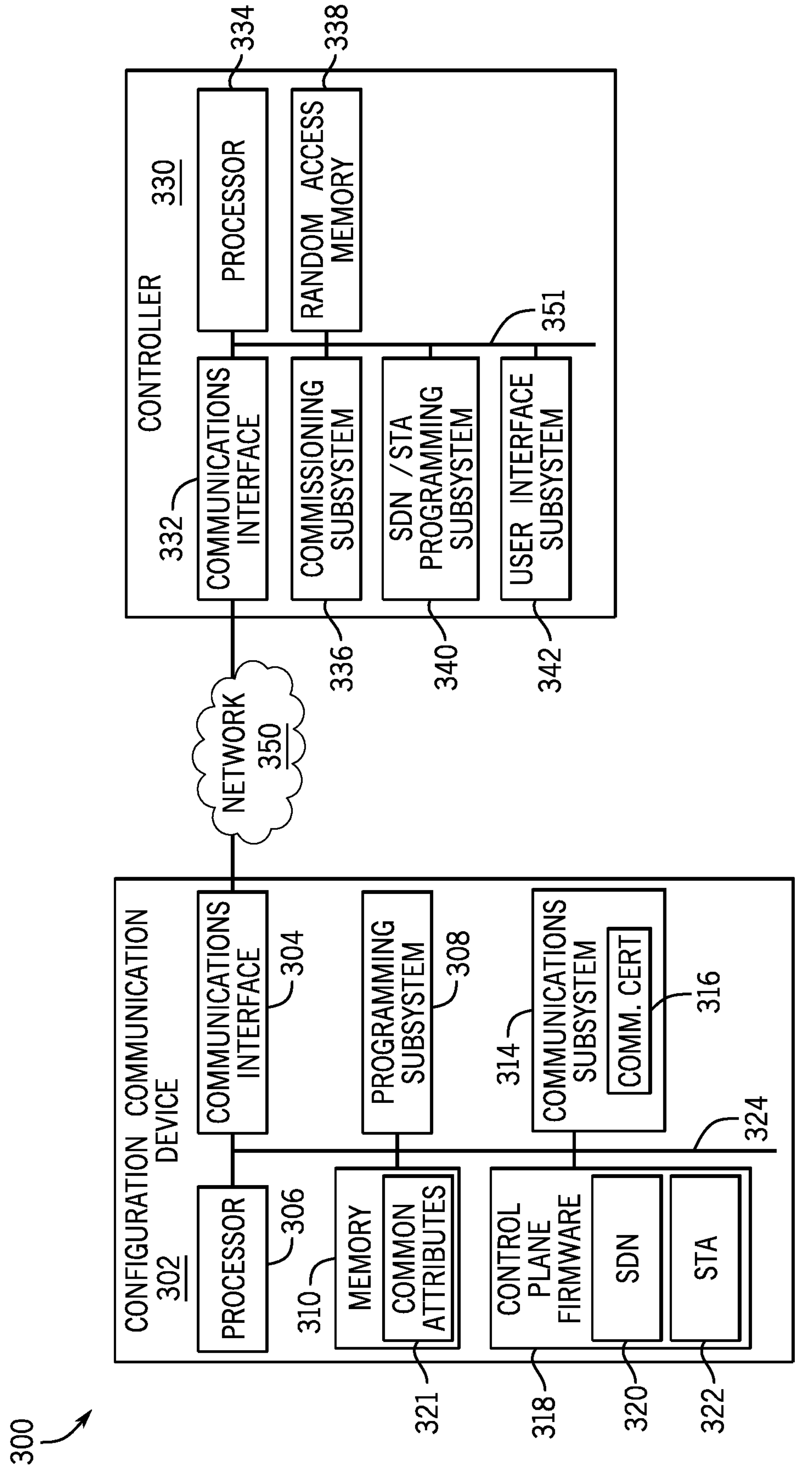
FIG. 3A illustrates a block diagram of a configurable communication device with separate firmware for separate control planes, controller, and communications network in accordance with several embodiments.

FIG. 3A illustrates a functional block diagram of a system 300 including a configurable communication device 302 and a controller 330 configured to control and configure communication devices consistent with embodiments of the present disclosure. In some embodiments, the configurable communication device 302 and the controller 330 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

The configurable communication device 302 and the controller 330 each include a communications interface 304 and 332, respectively. The communications interfaces 304 and 332 may each be in communication with the communications network 350. The communications interfaces 304 and 332 may include multiple interfaces/ports for communicating using the one or more control planes. Furthermore, the communications network 350 may include portions that utilize different control planes. For example, the communications network 350 may include one or more fabrics of devices utilizing an STA control plane and one or more fabrics of devices utilizing an SDN control plane. Some of the devices may be included in multiple fabrics at the same time and/or at different times.

The communication interfaces 304 and 332 may enable the configurable communication device 302 and the controller 330 to respectively interface with various other electronic devices via the network 350 and/or via other connections. In some embodiments, the communication interfaces 304 and 332 may include an I/O port for a hardwired connection for charging and/or content manipulation using a standard connector and protocol, a universal serial bus (USB), or other similar connector and protocol. The communication interfaces 304 and 332 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), a network employing one of the IEEE 802.15.4 family of protocols, and/or a wide area network (WAN).

Data busses 324 and 351 may facilitate communication among various components of the configurable communication device 302 and the controller 330, respectively.

Processors 306 and 334 may be configured to process communications and to coordinate the operation of the other components of the configurable communication device 302 and the controller 330, respectively. Processors 306 and 334 may operate using any number of processing rates and architectures. Processors 306 and 334 may be configured to perform any of the various algorithms and calculations described herein. Processor 306 may be embodied as a general-purpose integrated circuit, an application specific integrated circuit, a field-programmable gate array, and/or any other suitable programmable logic device. The processors 306 and 334 may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. Instructions to be executed by processors 306 and 334 may be stored in memory 310 and 338, respectively. As such, the memory 310 and 338 may include tangible, computer-readable media including memory or storage that stores instructions or routines to be executed by the processors 306 and 334. The memory 310 and 338 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 306 and 334 to enable the configurable communication device 302 and the controller 330 to perform various functions.

A commissioning subsystem 336 may be configured to commission the configurable communication device 302 when the device is initially connected to the network 350. Commissioning subsystem 336 may specifically be configured to configure the configurable communication device 302 in accordance with the one or more control planes, such as between an SDN and an STA. In one embodiment, the commissioning subsystem 336 may interact with the configurable communication device 302 to select between the SDN firmware 320 and STA firmware 322 in the control plane firmware 318. The configurable communication device 302 may operate in accordance with the selected one or more control planes. In some embodiments, a single firmware may be suitable for implementing SDN and STA control planes. Furthermore, the controller 330 may populate common attributes 321 with attributes that are common between SDN and STA. As previously noted, there may be multiple control plane types in the configurable communication device 302 that may be used in an operational technology (OT) network. For instance, the spanning-tree-managed switches (STA) may use an STA control plane and software-defined networking-managed switches (SDN) may use an SDN control plane. Each management type and control may have value under certain conditions. Therefore, it may useful to provide a single hardware switch that can run multiple control planes.

An SDN/STA programming subsystem 340 may operate in conjunction with a programming subsystem 308 to program the configurable communication device 302 to communicate with other devices (not shown) connected to network 350. The programming subsystem 308 may receive data flows from SDN/STA programming subsystem 340. The data flows may be modified by the SDN/STA programming subsystem 340 based on conditions of the network 350.

A communications subsystem 314 may be configured to route data communications through the communications network 350 based on the data flows managed by programming subsystem 308. In some embodiments, a communications certificate 316 may be used to encrypt or authenticate data transmitted by the configurable communication device 302.

A user interface subsystem 342 may be configured to receive user approval of newly detected devices in the communications network 350. In various embodiments, user approval may be required before communication with a new device is permitted. Until communication is enabled by user approval, the new device may be quarantined and may be excluded from communications within the network 350. Such exclusion may be achieved by routing data flows around the new device, blacklisting the new device, and the like until it is permitted on the network 350. As such, the user interface subsystem 342 may include a display. The display may facilitate users to view images. In some embodiments, the display may include a touch screen, which may facilitate user interaction with a user interface. Furthermore, it should be appreciated that, in some embodiments, the display may include one or more liquid crystal displays (LCDs), light-emitting diode (LED) displays, organic light-emitting diode (OLED) displays, active-matrix organic light-emitting diode (AMOLED) displays, or some combination of these and/or other display technologies. The user interface subsystem 342 may also include input structures. The input structures may include a mouse, keyboard, track-pad, touchscreen, or any other device suitable to enable a user to interact with the user interface subsystem 342 (e.g., pressing a button to increase or decrease a volume level).

The user interface subsystem 342 may enable controller 330 to interface with various other electronic devices. In some embodiments, the user interface subsystem 342 may include an I/O port for a hardwired connection for charging and/or content manipulation using a standard connector and protocol, such as a universal serial bus (USB) or other similar connector and protocol.

Figure 3B:
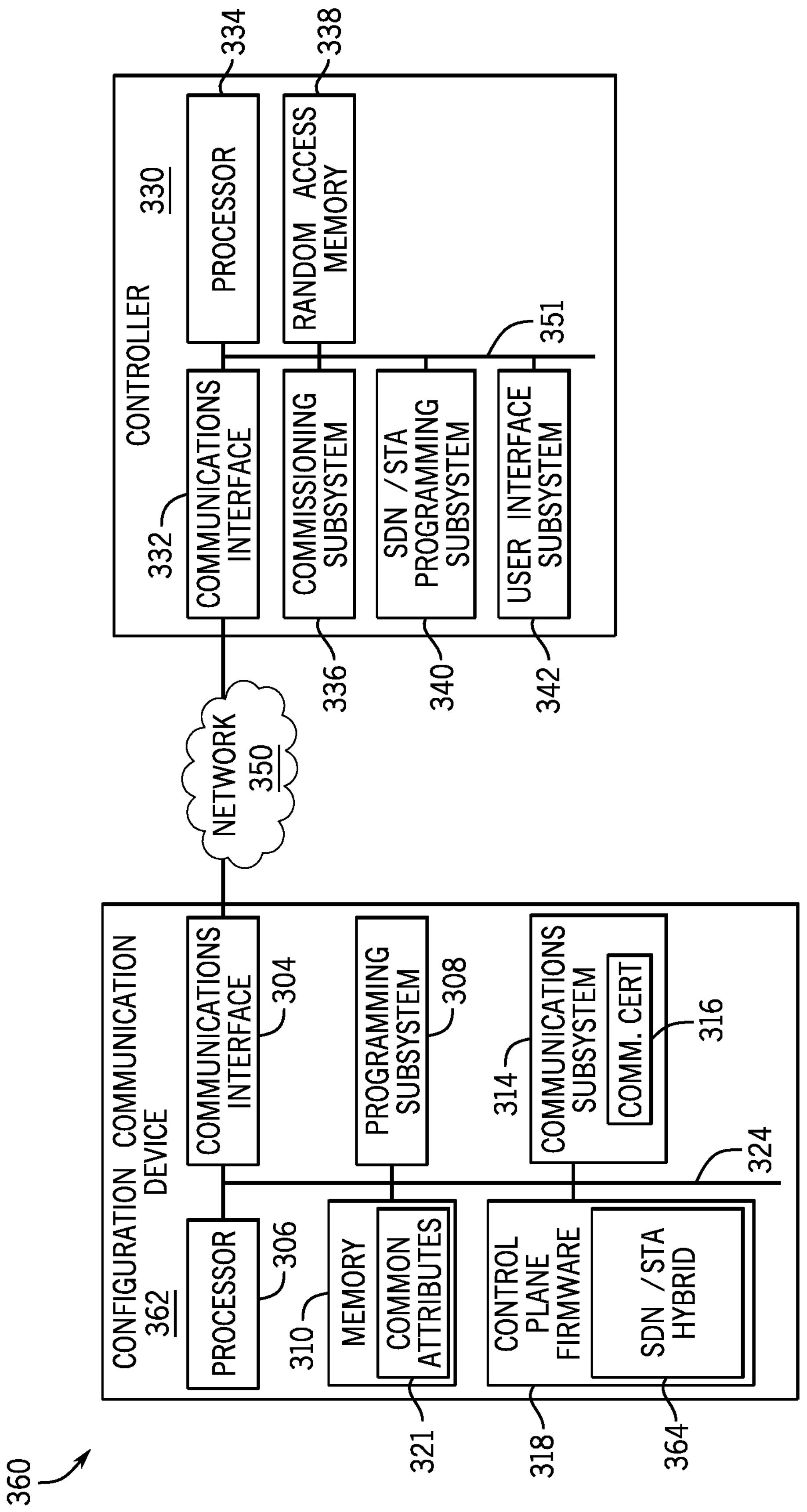
FIG. 3B illustrates a block diagram of a configurable communication device with a hybrid firmware for multiple control planes, controller, and communications network in accordance with several embodiments.

FIG. 3B illustrates a functional block diagram of a system 360 including the devices and subsystems of FIG. 3A. However, the control plane firmware 318 of a configurable communication device 362 of FIG. 3B includes a hybrid control plane module 364. The hybrid control plane module 364 may include instructions for operating in accordance with both SDN and STA control planes. Upon receipt of a command from the controller 330 or using self-detection, the configurable communication device 362 may execute the SDN instructions or the STA instructions to operate in accordance with SDN or STA control planes, respectively. Furthermore, using these instructions, the configurable communication device 362 may be configured to operate on a single control plane type per device and/or may operate on different control plane types for different ports of the device.

Figure 4:
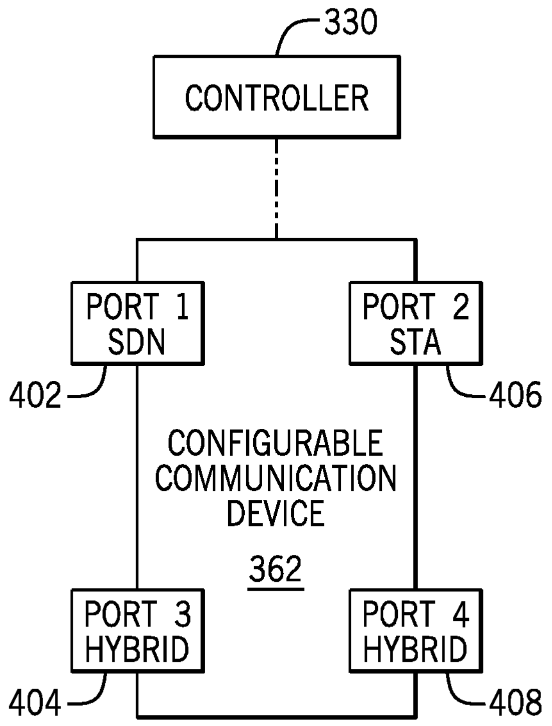
FIG. 4 illustrates a block diagram of the configurable communication device of FIG. 3B with hybrid ports using the hybrid firmware of FIG. 3B in accordance with several embodiments.

FIG. 4 illustrates a functional block diagram of the configurable communication device 362 with various ports 402, 404, 406, 408. As illustrated, the port 402 is configured to operate in accordance with an SDN control plane. Likewise, port 406 is configured to operate in accordance with an STA control plane. Ports 404 and 408 operate in hybrid mode, where certain communications are treated in accordance with SDN control plane instructions, and other communications are treated in accordance with STA control plane instructions.

As previously discussed, a controller (e.g., the controller 106, 202, and/or 330) may manage one or more communication devices (e.g., switches, etc.). The controller manages the inventory, topology, configuration, and situational awareness of the network by managing the one or more communication devices. In other words, the controller tracks which devices are on the network and the attributes of those devices, such as firmware versions, serial numbers, addresses, physical locations, and/or operational states. The controllers manage the topology and situational awareness by tracking what hosts are connected to a network and the physical connections of these hosts to switches or other communication devices. The controller also manages the configuration of the one or more communication devices by accessing/controlling their settings.

As previously discussed, the communication devices of the data planes may be configured to operate in accordance with more than one control plane. The communication devices 110, 112 may all be configured to operate in accordance with a single control plane such as SDN, with all switches operating SDN firmware. Additionally or alternatively, the communication devices 110, 112 may be all configured to operate in accordance with a control plane implementing a communication protocol such as spanning tree protocol with all switches operating STA firmware.

The one or more communication devices, as previously discussed, may be a single platform/device that is configurable between multiple control planes (e.g., SDN and STA). Thus, the switches of the present disclosure may include the ability to convert from STA to SDN, and SDN to STA through firmware upgrades, manual selection, self-discovery, or other mechanisms. Furthermore, as discussed below, some embodiments of the communication devices may have both control plane capabilities in a single firmware so the conversion between control planes would be configurable without firmware upgrades needed and/or may enable the device to operate in different control planes simultaneously.

Figure 5:
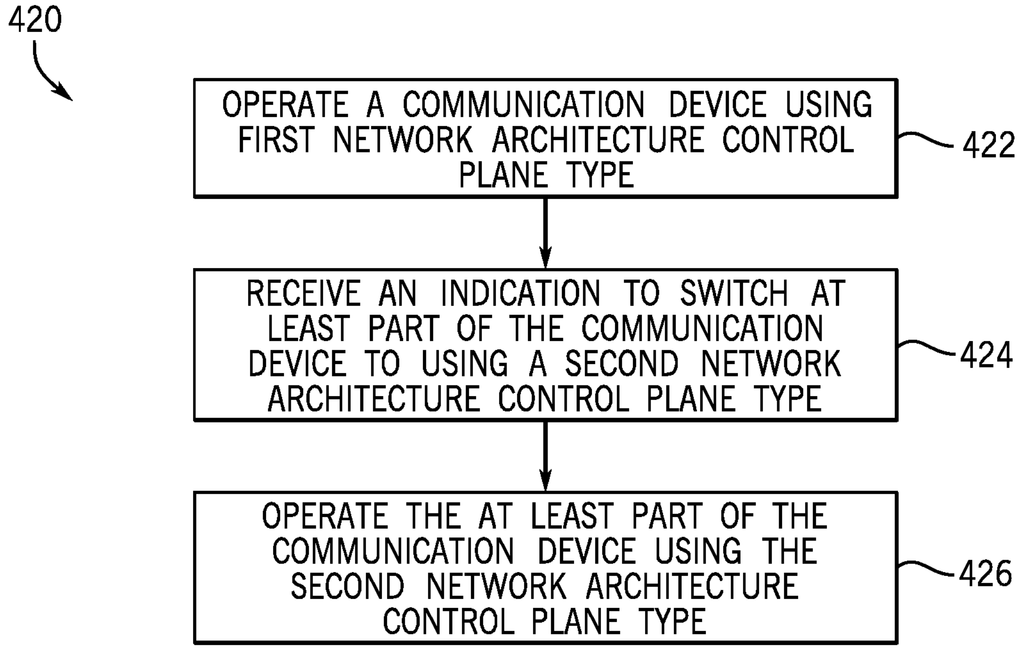
FIG. 5 illustrates a flow diagram of a process using the configurable communication device of FIG. 3A or 3B to utilize different network architecture control plane types in accordance with several embodiments.

FIG. 5 flow chart of a process 420 for operating a communication device, such as the communication devices 110, 112, 206, 302, and/or 362. Initially, the network communication device operates using a first network architecture control plane type (block 422). For instance, the communication device may be first configured to use STA or SDN control planes. For example, the configuration may include storing and/or loading firmware for the communication device. Additionally or alternatively, a respective controller may be used to control one or more settings of the communication device including control plane settings. For instance, the controller may set the control plane to be used using a manual input from the user interface subsystem 342. In some embodiments, the communication device may be embodied as a computing device, a switch (e.g., a multilayer switch), a hub, a repeater, a gateway, a router, a network bridge, a modem, a wireless access point, a line driver, a protocol converter, a terminal adapter, a proxy server, a firewall device, a network address translator, a multiplexer, a network interface controller, and/or the like.

The communication device then receives an indication to switch at least part of the communication device to operate using a second network architecture control plane type (block 424). For instance, the indication may include the communication device receiving a firmware upgrade that switches the communication device from the first network architecture control plane type (e.g., SDN or STA) to the second network architecture control plane type (e.g., STA or SDN). Additionally or alternatively, the indication may include an indication of a setting change from the controller. Additionally or alternatively, the indication may be received from the user interface subsystem 342. In some embodiments, the indication to switch may be received before operating using the first network architecture control plane type. For instance, when only a portion (e.g., a port) of the communication device is to be changed to the second network architecture control plane type, a remaining portion of the communication device may continue to use the first network architecture control plane type.

The communication device then operates the at least part of the communication device using the second network architecture control plane type (block 426). Thus, in some embodiments, the at least part of the communication device has switched from an STA control plane to an SDN control plane or vice versa. As previously noted, this at least part of the communication device may include the whole communication device or a port of the communication device. In some embodiments, what constitutes the at least part of the communication device (e.g., whole device, a port, etc.) may be set using the user interface subsystem 342.

Furthermore, in some embodiments, when operating the at least part of the communication device using the second network architecture control plane type, the controller and/or the communication device may translate settings and configurations during conversion to the second network architecture control plane type. For instance, the configurable communication device 302 and/or the controller 330 may translate settings and configurations using common attributes 321. By performing such translations during the conversions process, the at least part of the communication device may move from one control plane to another while minimizing interruptions to network traffic that is in flight before, during, and/or after the conversion.

Figure 6:
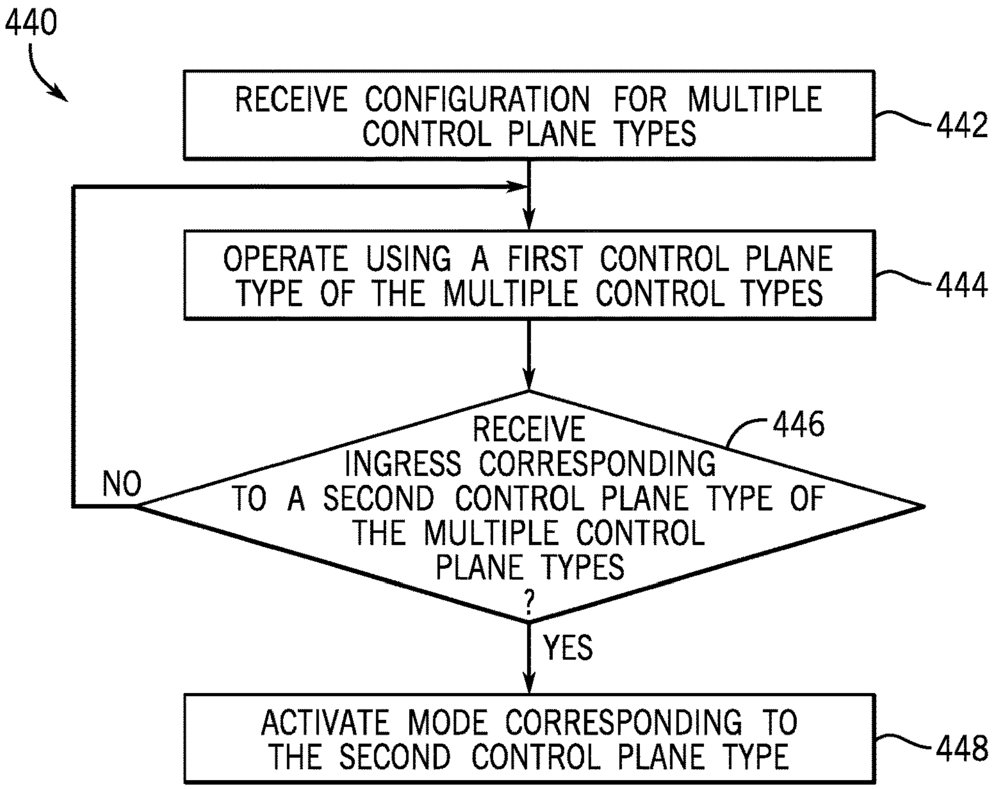
FIG. 6 illustrates using self-discovery of which control plane type to use based on data ingress into a communication device in accordance with several embodiments.

As previously noted, the communication device may self-discover which control plane to use. In other words, the selection of which control plane type may be at least partially automated in response to unique aspects of one of the control plane types. FIG. 6 is a process 440 of self-discovery using a communication device and/or controller. The communication device receives a configuration for multiple control plane types (block 442). For instance, the communication device may receive firmware for multiple control plane types (e.g., STA, SDN, or others). Additionally or alternatively, the controller may cause the communication device to be set to a default for the communication device. Additionally or alternatively, the default control plane type may be set using the user interface subsystem 342. The communication device then operates using a first control plane type of the multiple control plane types (block 444). For instance, the communication device may operate using the default control plane type set by the controller (e.g., due to an input received via the user interface subsystem 342).

The controller and/or communication device determines whether the communication device receives an ingress that is corresponding to a second control plane type of the multiple control plane types (block 446). For instance, the ingress may be a data ingress that is unique to the second control plane type that does not occur for the first control plane type. For example, a switch or other communication device may have bridge priority data unit (BPDU) ingress or other ingress types. Since BPDU (or other ingress types) may only occur in the second control plane type (e.g., STA) and not in the first control plane type (e.g., SDN), the controller and/or the communication device may determine that ingress corresponding to the second control plane type has been received. If no data ingress corresponding to the second control plane type is determined to have been received, the communication device continues operating using the first control plane. However, if data ingress corresponding to the second control plane type is determined to have been received, the controller and/or the communication device activates a mode corresponding to the second control plane type (block 448). For instance, the controller and/or the communication device may switch the whole device (e.g., all ports) or only part of the communication device (e.g., a portion of the ports).

Furthermore, in some embodiments, self-discovery may only be open for certain windows of time. For instance, a port or device could default to the first control plane type unless the ingress corresponding to the second control plane type occurs within a certain time frame as a threshold after which ingress-based switching of control planes may be blocked even if ingress corresponding to the second control plane type is received.

Figure 7:
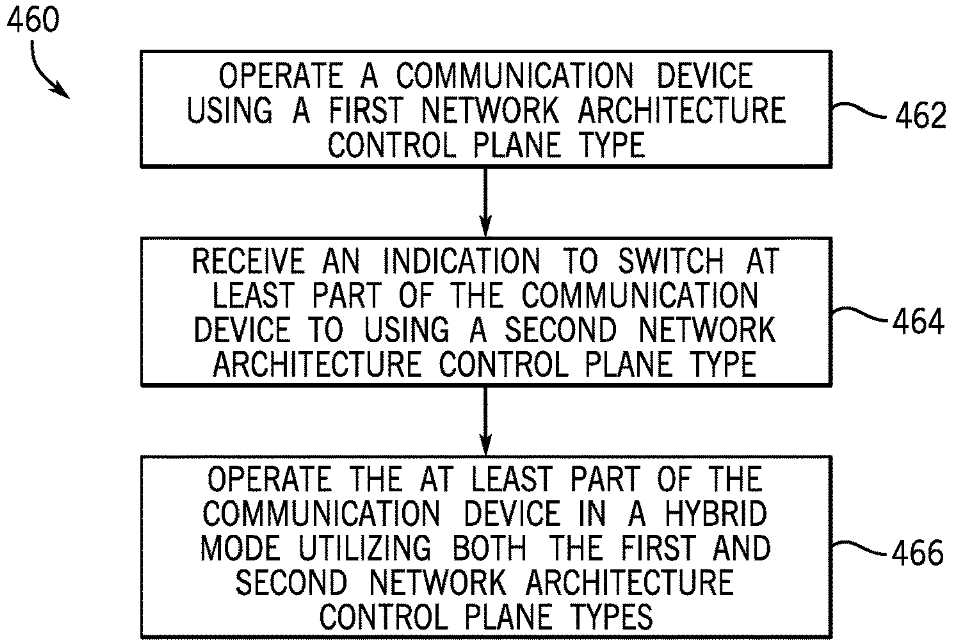
FIG. 7 illustrates a flow diagram of a process using the configurable communication device of FIG. 3A or 3B to use a hybrid mode for multiple control plane types in accordance with several embodiments.

As previously noted, each port and/or communication device on the network may use a first control plane type, a second control plane type, or a hybrid of two or more control plane types. FIG. 7 is a flow diagram of a process 460 of a communication device using a hybrid mode to enable using a first control plane type or a second control plane type through the same device/port. In other words, the communication device, such as the communication devices 110, 112, 206, 302, and/or 362, operate in a hybrid mode.

As illustrated, the network communication device operates using a first control plane type (block 462). For instance, the communication device may be first configured to use STA or SDN control planes. For example, the configuration may include storing and/or loading firmware for the communication device. Additionally or alternatively, a respective controller may be used to control one or more settings of the communication device including control plane settings. For instance, the controller may set the control plane to be used using a manual input from the user interface subsystem 342. In some embodiments, the communication device may be embodied as a computing device, a switch (e.g., a multilayer switch), a hub, a repeater, a gateway, a router, a network bridge, a modem, a wireless access point, a line driver, a protocol converter, a terminal adapter, a proxy server, a firewall device, a network address translator, a multiplexer, a network interface controller, and/or the like.

The communication device then receives an indication to switch at least part of the communication device to operate using a second control plane type (block 464). For instance, the indication may include the communication device receiving a firmware upgrade that switches the communication device from the first control plane type (e.g., SDN or STA) to the second control plane type (e.g., STA or SDN). Additionally or alternatively, the indication may include an indication of a setting change from the controller. Additionally or alternatively, the indication may be received from the user interface subsystem 342. In some embodiments, the indication to switch may be received before operating using the first control plane type. For instance, when only a portion (e.g., a port) of the communication device is to be changed to the second control plane type, a remaining portion of the communication device may continue to use the first control plane type.

The communication device then operates the at least part of the communication device using a hybrid mode utilizing both the first and second control plane types (block 466). Thus, in some embodiments, the at least part of the communication device has switched from an STA control plane to an SDN control plane or vice versa. As previously noted, this at least part of the communication device may include the whole communication device or one or more ports of the communication device. In some embodiments, what constitutes the at least part of the communication device (e.g., whole device, a port, etc.) may be set using the user interface subsystem 342. Furthermore, in some embodiments, the hybrid mode may be set by default and occur prior to operating the communication device using the first network architecture control plane type and/or the default application of the hybrid mode may be or may include the indication to switch at least part of the communication device.

Figure 8:
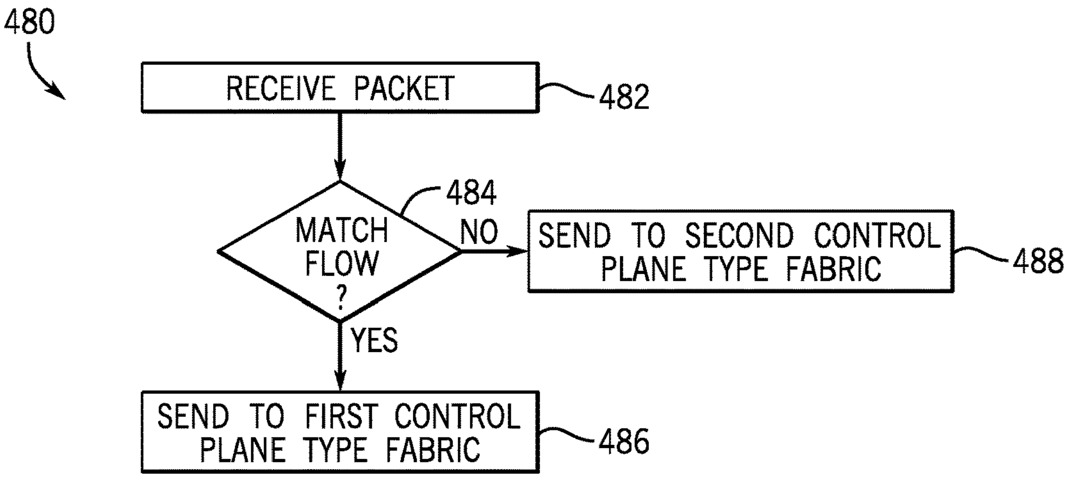
FIG. 8 illustrates a flow diagram of a process using the configurable communication device of FIG. 3A or 3B to perform packet-based direction to different control plane fabrics based on the packet in accordance with several embodiments.

The ability to run a hybrid mode on a single communication device or even port may be based on a per-packet basis. FIG. 8 is a flow diagram of a process 480 for operating a hybrid communication device. The communication device receives a packet of data (block 482). The packet may be received at a first port or received from memory (e.g., a buffer) of the communication device. The communication device may determine whether the ingressing packet matches a flow for a first control plane type (block 484). For instance, the first control plane type may include a SDN. If the packet matches a flow on the first control plane type, the communication device may send the packet to a first control plane type fabric (block 486). The first control plane type fabric is a subnetwork of the network on which the communication device resides where each device on the subnetwork uses the first control plane type. If the packet does not match a flow, the communication device sends the packet to a second control plane type fabric (block 488). The second control plane type fabric is a subnetwork of the network on which the communication device resides where each device on the subnetwork uses the second control plane type.

As part of the hybrid mode/conversion, the controller and/or the communication device may translate settings and configurations when switching between control plane types as each control plane type may use different control mechanisms (e.g., virtual local area network (VLAN) tagging or address-based flow configurations). As previously noted, the communication devices (e.g., switches) may support different control plane types using at least a spanning tree based (STA) management and an operational technology software define network (OT SDN) management. As previously noted, conversion between the two control planes may be accomplished through firmware upgrades or other to enable conversion in either direction from either SDN to STA or STA to SDN. During this conversion, the communication device/controller may reset all configurations after the conversion to place the communication device to a factory default state ready to be commissioned and configured. Additionally or alternatively, the conversion may place the configuration into the communication for the new control plane that allows the existing traffic to keep operating without being reset to a factory default.

Figure 9:
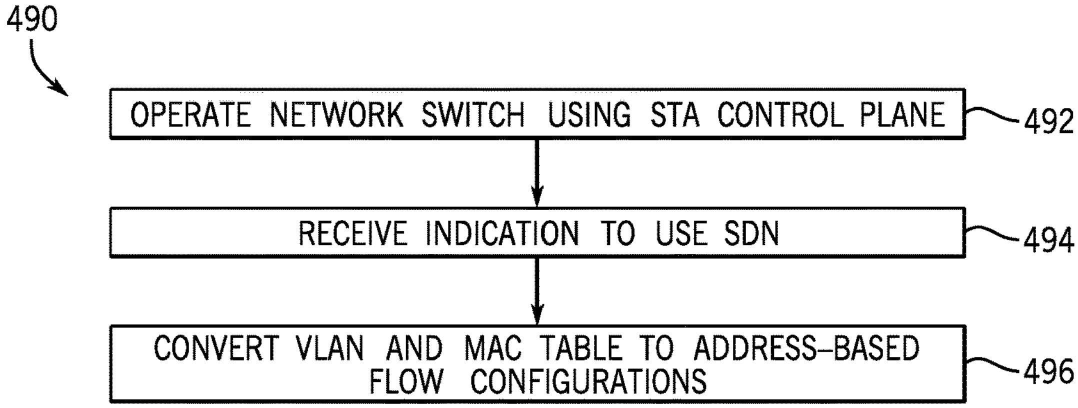
FIG. 9 illustrates a flow diagram of a process using the configurable communication device of FIG. 3A or 3B to convert configuration/settings in an STA control plane to configure settings for an SDN control plane in accordance with several embodiments.

FIG. 9 is a flow diagram of a process 490 for operating a communication device (e.g., switch). A controller and/or communication device operates the communication device using an STA control plane (block 492). Additionally or alternatively, the control plane may be any VLAN-based tagging control plane types. The controller and/or the communication device also receives an indication to use SDN (block 494). Additionally or alternatively, the indication may indicate that any other suitable address-based flow configuration-based control plane types may be used. Moreover, the indication may be any suitable mechanism to indicate that SDN is to be used, such as an update of firmware, a command from another device, a received input (e.g., via the user interface subsystem 342), self-discovery, and/or initiation of a hybrid mode. Additionally or alternatively, the indication may indicate that STA and SDN are both to be initially used and that configuration for the SDN is to be derived from STA-based settings/configurations.

Since address and flow-based control planes (e.g., SDN) uses VLAN tagged information differently, the controller and/or communication device converts VLAN and MAC table to generate address-based flow configurations (block 496). In other words, the settings/configurations for SDN may be derived from information known to the controller and from the STA configuration/settings. For example, for unicast communications, device/port address to device/port address flow configurations may be made for all hosts in the same VLAN. For instance, the addresses may be MAC address to MAC address or IP address to IP address between devices/ports. For multicasts, data may be multicast to everyone in a VLAN using a masked off address (e.g., MAC address of 01-XX-XX-XX-XX-XX) that causes all devices from the VLAN to catch all multi-casts.

Figure 10:
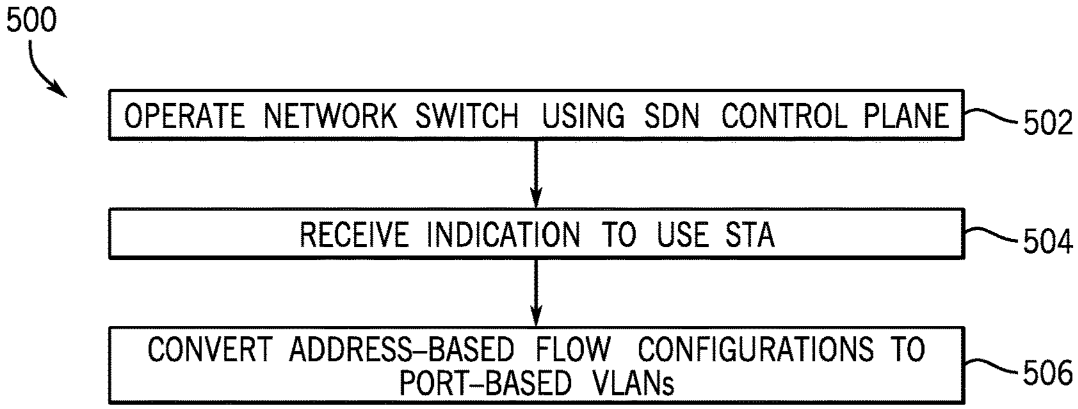
FIG. 10 illustrates a flow diagram of a process using the configurable communication device of FIG. 3A or 3B to convert configuration/settings in an SDN control plane to configure settings for an STA control plane in accordance with several embodiments.

FIG. 10 is a flow diagram of a process 500 for operating a communication device (e.g., switch). A controller and/or communication device operates the communication device using an SDN control plane (block 502). Additionally or alternatively, the control plane may be any other suitable address-based flow configuration-based control plane types. The controller and/or the communication device also receives an indication to use STA (block 504). Additionally or alternatively, the indication may indicate that any other suitable any VLAN-based tagging control plane types are to be used. Moreover, the indication may be any suitable mechanism to indicate that STA is to be used, such as an update of firmware, a command from another device, a received input (e.g., via the user interface subsystem 342), self-discovery, and/or initiation of a hybrid mode. Additionally or alternatively, the indication may indicate that STA and SDN are both to be initially used and that configuration for the STA is to be derived from SDN-based settings/configurations.

Since devices using VLAN-based control planes (e.g., STA) talk to each other (and the controller), the controller and/or communication device converts address-based flow configurations to port-based VLANs (block 506). In other words, the settings/configurations for STA may be derived from information known to the controller and from the SDN configuration/settings. For example, the controller and/or communication devices may program tagged VLAN ports based on multicast flows. This programming sets up VLAN domains for any tagged packet that any host serves up onto the network. Moreover, every host may be on an untagged port so all unicast messaging works using a flat network for any untagged packet any host sends into the network. In some embodiments, the conversion may allow trunk tagging only after initial conversion.

As may be appreciated, the conversions performed in FIGS. 9 and 10 may be performed with or without user interaction and minimal interruption to network traffic. Instead, the indication (e.g., user initiation) may activate the conversion in the controller. The other steps may then be automated including the firmware upgrade and the settings that are applied to each communication device (e.g., switch). In some embodiments, some settings may be maintained through the conversion, such as precision time protocol, Media Access Control Security (MACsec) associations, and the like.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A configurable communication device, comprising:
a communication interface comprising:
a first configurable physical port configured to switch between a first control plane type and a second control plane type, wherein the first configurable physical port is configured to use solely the first control plane type during operation when configured to the first control plane type; and
a second configurable physical port configured to switch between the first control plane type and the second control plane type, wherein the second configurable physical port is configured to use solely the second control plane type when configured to the second control plane type during operation;
a computer-readable, tangible, and non-transitory media storing instructions comprising:
a first control plane block of instructions to implement the first control plane type; and
a second control plane block of instructions to implement the second control plane type;
a processor configured to execute the instructions to cause:
the configurable communication device to implement the first control plane block of instructions, the second control plane block of instructions, or both;
the configurable communication device to execute as a switch of the first control plane type using the communication interface upon implementation of the first control plane block of instructions; and
the configurable communication device to execute as a switch of the second control plane type using the communication interface upon implementation of the second control plane block of instructions.

2. The configurable communication device of claim 1, wherein the first control plane type comprises a software-defined network (SDN) type of control plane.

3. The configurable communication device of claim 2, wherein the second control plane type comprises a spanning tree protocol (STA) type of control plane.

4. The configurable communication device of claim 1, wherein the processor, upon execution of the instructions, is configured to:

receive a first packet of data;

determine that the received first packet of data matches a flow on a first control plane fabric of the first control plane type; and send the first packet of data to the first control plane fabric using the first configurable physical port.

5. The configurable communication device of claim 4, wherein the first packet of data is received from the second configurable physical port or a third configurable physical port of the communication interface.

6. The configurable communication device of claim 4, wherein the processor, upon execution of the instructions, is configured to:

receive a second packet of data;

determine that the received second packet of data does not match the flow on the first control plane fabric of the first control plane type; and send the second packet of data to a second control plane fabric using the second configurable physical port.

7. The configurable communication device of claim 6, wherein the second packet of data is received from the first configurable physical port or a third configurable physical port of the communication interface.

8. A method of operating a configurable communication device, comprising:

operating the configurable communication device using a first network architecture control plane type;

receiving an indication to switch at least part of the configurable communication device to using a second network architecture control plane type before the configurable communication device receives a packet of data corresponding to the second network architecture control plane type, wherein the indication is received from a user interface subsystem configured to receive a manual input from a user; and operating the at least part of the configurable communication device in a hybrid mode utilizing both the first and second network architecture control plane types, wherein the configurable communication device comprises a communication interface having a first configurable physical port configured to use solely the first network architecture control plane type during operation and a second configurable physical port configured to use solely the second network architecture control plane type during operation.

9. The method of claim 8, wherein the first network architecture control plane type comprises a software-defined network (SDN) type of control plane.

10. The method of claim 9, wherein the second network architecture control plane type comprises a spanning tree protocol (STA) type of control plane.

11. The method of claim 8, wherein operating the at least part of the configurable communication device comprises implementing a network switch with both the first and second network architecture control plane types.

12. The method of claim 8, wherein the first configurable physical port is configured to use solely the first network architecture control plane type when the first configurable physical port is configured to the first network architecture control plane type, and the second configurable physical port is configured to use solely the second network architecture control plane type when the second configurable physical port is configured to the second network architecture control plane type.

13. The method of claim 8, further comprising translating settings and configurations from the first network architecture control plane type to the second network architecture control plane type during the operating of the at least part of the configurable communication device in the hybrid mode.

14. The method of claim 8, wherein the configurable communication device comprises a switch.

15. The method of claim 8, wherein the first configurable physical port and the second configurable physical port are each configured to switch between the first network architecture control plane type and the second network architecture control plane type.

16. A configurable communication device, comprising:

a communication interface;

memory storing instructions and configuration for a plurality of control plane types;

a processor, that when executing the instructions, is configured to:

receive the configuration for the plurality of control plane types;

operate using a software-defined network (SDN) control plane type of the plurality of control plane types;

receive an ingress of data corresponding to a spanning tree protocol (STA) control plane type of the plurality of control plane types;

determine that the ingress of data is received within a threshold time;

activate a mode corresponding to the STA control plane type based on the received ingress of data in response to determining the ingress of data was received within the threshold time; and block the ingress of data in response to determining the ingress of data was not received within the threshold time.

17. The configurable communication device of claim 16, wherein the ingress of data comprises receiving bridge priority data unit (BPDU) data received at the configurable communication device, wherein the BPDU data is unique to the STA control plane type and unsuitable for the SDN control plane type.

18. The configurable communication device of claim 16, wherein the mode comprises a hybrid mode where the configurable communication device is configured to use both the STA control plane type and the SDN control plane type concurrently.

19. The configurable communication device of claim 16, wherein the mode comprises an STA mode that disables use of the SDN control plane type by the configurable communication device while the STA mode is active.

* * * * *